United States Patent [19]

Lange et al.

[11] 4,102,698
[45] Jul. 25, 1978

[54] SILICON NITRIDE COMPOSITIONS IN THE $Si_3N_4$-$Y_2O_3$-$SiO_2$ SYSTEM

[75] Inventors: Frederick F. Lange; Subhash C. Singhal, both of Franklin Twsp., Westmoreland County, Pa.

[73] Assignee: Westinghouse Electric Corp., Pittsburgh, Pa.

[21] Appl. No.: 744,380

[22] Filed: Nov. 23, 1976

[51] Int. Cl.² .......................................... C04B 35/58
[52] U.S. Cl. ........................................ 106/65; 106/55; 106/69; 106/73.2; 106/73.5; 264/65
[58] Field of Search .................. 106/73.5, 73.2, 55, 106/69; 264/65

[56] References Cited

U.S. PATENT DOCUMENTS

| | | | |
|---|---|---|---|
| 3,356,513 | 12/1967 | Washburn | 106/67 |
| 3,679,444 | 7/1972 | Washburn | 106/69 |
| 3,811,928 | 5/1974 | Henney et al. | 106/69 |
| 3,830,652 | 8/1974 | Gazza | 106/73.5 |
| 3,833,389 | 9/1974 | Komeya et al. | 106/55 |
| 3,969,125 | 7/1976 | Komeya et al. | 106/73.5 |
| 4,025,351 | 5/1977 | Masaki | 106/69 |
| 4,039,340 | 8/1977 | Weaver | 106/55 |
| 4,043,381 | 8/1977 | Mazdiyasni | 164/132 |
| 4,046,580 | 9/1977 | Ishii et al. | 106/73.2 |

OTHER PUBLICATIONS

Wills, R. R. - "Silicon Yttrium Oxynitrides", J. Am. Cer. Soc., Oct. 1974, p. 459.
Terwilliger, G. R. et al. - "Hot-Pressing Behavior of $Si_3N_4$" J. Am. Cer. Soc., Jan. 1974, pp. 25-29, (p. 28).
Colquhoun, I. et al., "The Determination of Surface Silica and its Effect on the Hot-Pressing Behavior of Alpha-Silicon Nitride Powder" - Prog. of Brit. Cer. Soc.-No. 22 (1973), pp. 181-195.

*Primary Examiner*—Helen M. McCarthy
*Attorney, Agent, or Firm*—R. T. Randig

[57] ABSTRACT

Dense, ceramic compositions fabricated within the $Si_3N_4$-$Si_2N_2O$-$Y_2Si_2O_7$ compatibility triangle in the $Si_3N_4$-$SiO_2$-$Y_2O_3$ system are extremely stable in oxidizing environments and particularly suited for use as a high temperature structural material. In addition, the hot-pressed, densified articles fabricated from compositions within the compatibility triangle exhibit improved strength and creep resistance at elevated temperatures relative to commercial $Si_3N_4$.

2 Claims, 4 Drawing Figures

SILICON NITRIDE COMPOSITIONS IN THE $Si_3N_4$-$Y_2O_3$-$SiO_2$ SYSTEM

The invention herein described was made in the course of or under a contact or subcontact thereunder, (or grant), with the Advanced Projects Agency, Office of Naval Research, Contract No. N00014-74-C-0284.

BACKGROUND OF THE INVENTION

This invention relates generally to composite materials formed from powders, and more particularly to hot-pressed composite materials of the silicon nitride ($Si_3N_4$)-silicon dioxide ($SiO_2$)-yttrium oxide ($Y_2O_3$) system.

DESCRIPTION OF THE PRIOR ART

Silicon nitride ($Si_3N_4$) is a ceramic material which, because of its ability to withstand high temperatures, its creep resistance and thermal shock resistance at high temperatures, has made it an ideal candidate for use in gas turbine engines such as for turbine blades and vanes.

Heretofore, it has been known in the production of silicon nitride bodies to add other materials thereto to enhance the strength and density thereof. Common densification aids employed in the prior art are magnesium oxide (MgO) or yttrium oxide ($Y_2O_3$). See for example U.S. Pat. No. 3,830,652, which teaches, in part, the addition of from 1.25 to 4.45 wt. % yttrium oxide, the balance silicon nitride. In the literature: "Effect of $Y_2O_3$ Additions On Hot-Pressed $Si_3N_4$," by G. E. Gazza, Bulletin of the American Ceramic Society, Volume 54, No. 9, pages 778–781 (1975). Preliminary property measurements at temperatures greater than 1300° C indicate that $Si_3N_4$ densified with $Y_2O_3$ exhibits significantly improved high temperature mechanical properties relative to silicon nitride densified with the more conventional hot-pressing aid MgO.

While we have found these results to be accurate, we have also determined that some of the silicon nitride-yttrium oxide materials are unstable at intermediate temperatures of about 1000° C despite their apparent stability at temperatures above 1300° C, as reported in the cited literature. We have determined that certain secondary phases are present in the silicon-yttrium-oxygen-nitrogen system which readily oxidize at intermediate temperatures of about 1000° C, having a deleterious effect on the properties of the resultant compounds. Our invention accordingly solves the problems heretofore encountered in this ceramic system by controlling the mol percentages of silicon nitride, yttrium oxide and silicon dioxide within a compatibility triangle in the ternary phase diagram whereby the harmful secondary phases are not present in the hot-pressed materials.

SUMMARY OF THE INVENTION

In accordance with the present invention, it has been discovered that certain secondary phases in the Si-Y-O-N system were unstable at temperatures of above 1000° C. In accordance with our invention, we have determined that materials fabricated within a triangular area defined by the compounds $Si_3N_4$-$Y_2Si_2O_7$-$Si_2N_2O$ of the $Si_3N_4$-$SiO_2$-$Y_2O_3$ ternary diagram precludes the formation of the unstable compounds. Materials falling within this triangular area exhibit improved oxidation resistance in the hot-pressed, densified state as well as improved creep and high temperature strength properties.

BRIEF DESCRIPTION OF THE DRAWINGS

The phase relationships between the various compounds as well as the properties and advantages of our invention will be better understood when reference is made to the drawings, in which.

DESCRIPTION OF THE PREFERRED EMBODIMENTS

Relatively pure silicon nitride ($Si_3N_4$) powder, containing about 0.5 wt. % oxygen and 0.75 wt. % $SiO_2$, requires between 15 to 25 wt. % yttrium oxide ($Y_2O_3$) to achieve full density, > 98% of theoretical density. This is achieved by hot-pressing the composite mixture at temperatures between 1600° and 1780° C utilizing 4000 psi for about 2–4 hours. After hot-pressing such a mixture, the major phase present in the densified mass is $\beta$ $Si_3N_4$. Secondary phases such as $Si_3Y_2O_3N_4$, $Y_5Si_3O_{12}N$ and an unidentified phase believed to be $YSiO_2N$ are also present. The proportion of each phase depends upon the $SiO_2$ and $Y_2O_3$ content of the initial powder and the phase relations in the $Si_3N_4$-$Y_2O_3$-$SiO_2$ ternary system. Mechanical property measurements performed on the silicon nitride-yttrium oxide composites indicate that the material is superior to hot-pressed silicon nitride with MgO at room temperature and at 1400° C. Surprisingly, however, we have determined that severe strength degradation occurs for these materials at 1000° C.

In order to investigate the cause of this unusual phenomenon, the oxidation behavior at 1000° C of silicon nitride hot-pressed with different amounts of yttrium oxide was tested. Substantial weight gains due to oxidation and severe cracking of the specimens was noted. Subsequent X-ray diffraction analysis showed that secondary phases such as $Si_3Y_2O_3N_4$ and $Y_5Si_3O_{12}N$ were the cause of the oxidation at these intermediate temperatures. In order to further investigate this phenomenon, samples were fabricated solely from the secondary phase materials.

Figure 1:
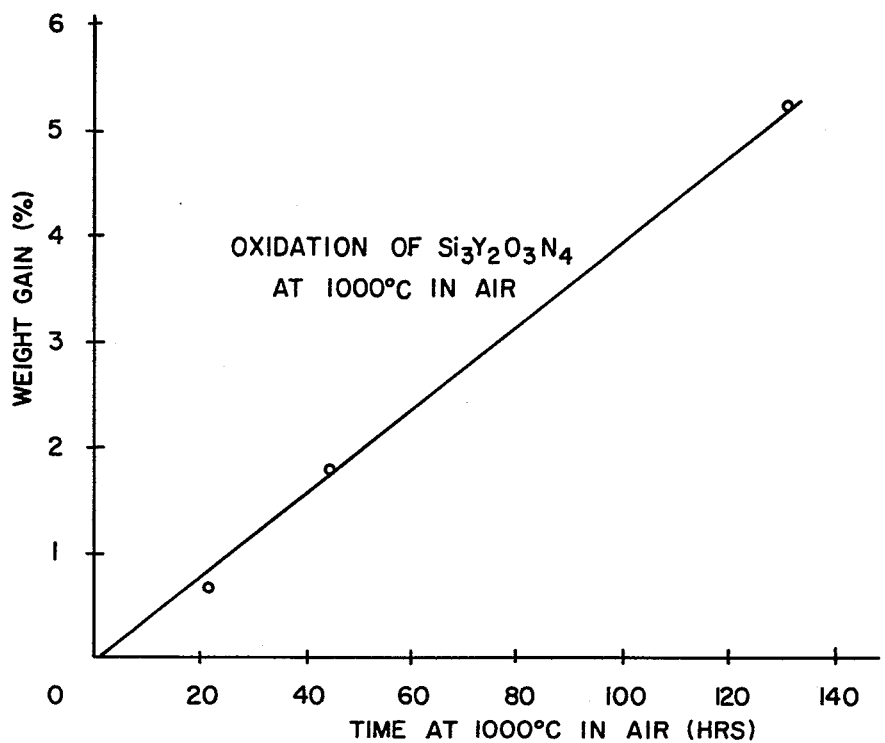
FIG. 1 is a graph indicating the linear oxidation behavior of the secondary phase $Si_3Y_2O_3N_4$ at 1000° C in air.

$Si_3Y_2O_3N_4$ and $Y_5Si_3O_{12}N$ bodies were prepared by hot-pressing constituent powders containing 38.25 wt. % $Si_3N_4$, 61.75 wt. % $Y_2O_3$, and 4.76 wt. % $Si_3N_4$, 76.87 wt. % $Y_2O_3$ and 18.37 wt. % $SiO_2$, respectively. The bodies were hot-pressed at 1750° C for 2 hours at a pressure of 4000 psi. Oxidation experiments were carried out at 1000° C in air for periods of up to 140 hours. FIG. 1 illustrates the results for the $Si_3Y_2O_3N_4$ compound. The oxidation kinetics of this material is linear, indicating that no protective surface layer forms to limit the oxidation of the secondary phase as is the case for $Si_3N_4$.

We have found that both secondary phases $Si_3Y_2O_3N_4$ and $Y_5Si_3O_{12}N$ are unstable in oxidizing atmospheres and that both materials oxidize to yttrium silicates and $SiO_2$. Thus, the cracking and strength degradation at intermediate temperatures of about 1000° C of silicon nitride-yttrium oxide materials is caused by the oxidation of these secondary phases. We further determined that at higher temperatures, i.e. above 1300° C, $SiO_2$ forms over the silicon nitride and further functions to protect the unstable phases. Hence, at temperatures where the kinetics of silicon nitride oxidation are too slow, i.e. below 1300° C, the secondary phases are unprotected by the layer of $SiO_2$ and the secondary phases therefore oxidize to degrade the mechanical properties of the composite.

Figure 2:
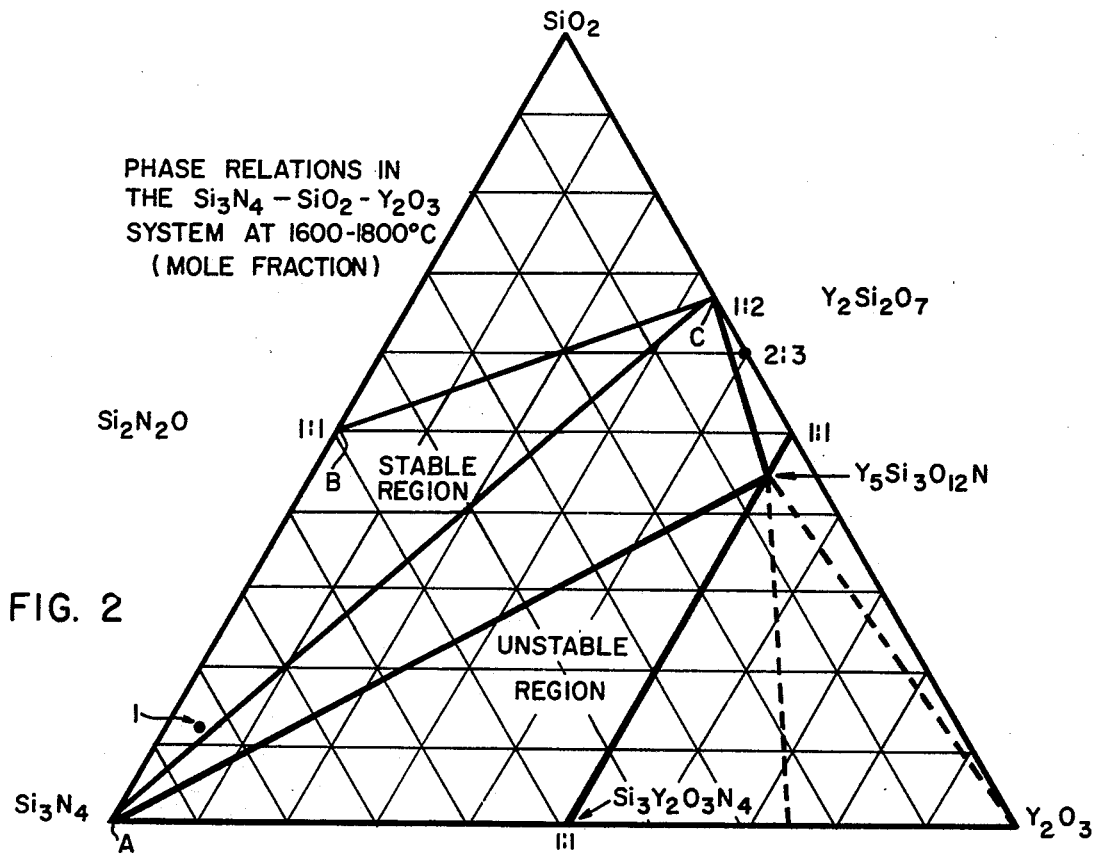
FIG. 2 is the ternary phase diagram of the $Si_3N_4$-$Y_2O_3$-$SiO_2$ system at 1600°–1800° C.

In order to eliminate the problem of strength degradation and oxidation at these intermediate temperatures, it is necessary to eliminate the secondary phases from the composite materials. Referring now to FIG. 2, the phase relations in the $Si_3N_4$-$SiO_2$-$Y_2O_3$ system at 1600°–1800° C is depicted. We have discovered that materials fabricated in the triangular area defined by the points $Si_3N_4$ (A), $Si_2N_2O$ (B), and $Y_2Si_2O_7$ (C) will not contain the unstable secondary phases. Materials fabricated in any other region of this ternary phase diagram where $Si_3N_4$ is an included phase contain one or more of the unstable phases and exhibit degradation at intermediate temperatures. As can be noted in FIG. 2, the $Si_2N_2O$ compound is at a point where the mol ratio between $Si_3N_4$ and $SiO_2$ is 1:1 and the $Y_2Si_2O_7$ compound is at a point where the mol ratio between $Y_2O_3$ and $SiO_2$ is 1:2.

We have determined that in order to have a high strength silicon nitride-yttrium oxide composition, which will not degrade at 1000° C intermediate temperaturess it is necessary to have silicon dioxide ($SiO_2$) in the initial mixture. We have further determined that the initial composition must fall within the compatibility triangle depicted in FIG. 2. Powder formulations having an initial composition within the compatibility triangle defined by the points ABCA of FIG. 2 were hot-pressed in a conventional non-oxidizing atmosphere at a pressure of 4000 psi at temperatures between 1750° and 1800° C for periods of 1 to 3 hours. Densities of > 98% of theoretical density were obtained after allowing provision in said composition for contamination by tungsten carbide. Properties of the materials formulated within the compatibility triangle were compared with the properties of commercial silicon nitride hot-pressed with MgO. The flexural strength data obtained at room temperature and at 1400° C are shown below in Table 1.

silicon nitride material. It is also noted in general, that the strengths decrease with decreasing silicon nitride content.

Figure 3:
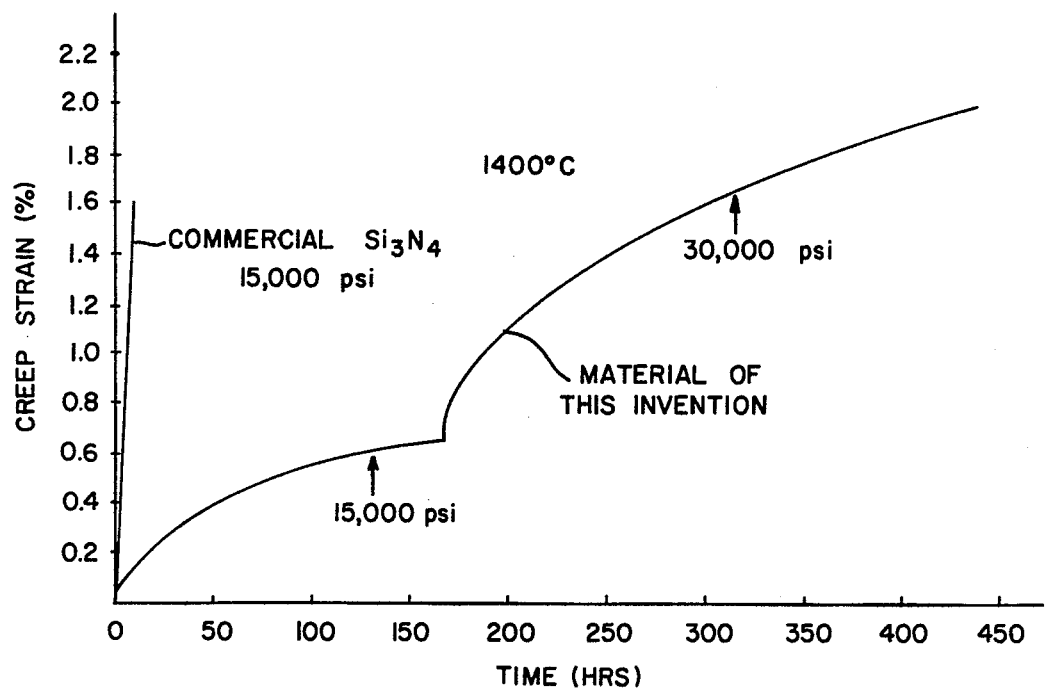
FiG. 3 is a graphical representation of the creep behavior of the materials of our invention and the silicon nitride material of the prior art.
Figure 4:
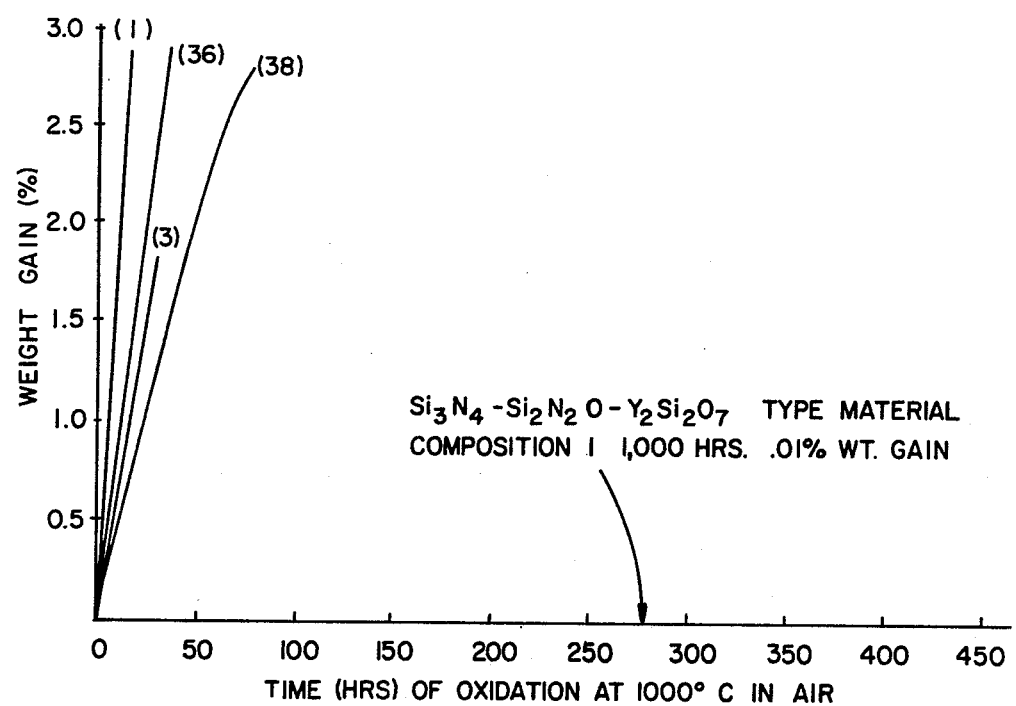
FIG. 4 is a graphical representation of the oxidation behavior of the materials of the present invention.

The excellent high temperature creep behavior of the materials of our invention is set forth in FIG. 3. Flexural creep measurements were performed at 1400° C, utilizing 15,000 psi and 30,000 psi on a material having an initial molar composition falling within the compatibility triangle of FIG. 2, viz., 0.84 $Si_3N_4$, 0.055 $Y_2O_3$ and 0.105 $SiO_2$. Also depicted on FIG. 4 is the creep data of a hot-pressed commercial $Si_3N_4$ at 15,000 psi. As shown in FIG. 3, the creep resistance of the $Si_3N_4$-$Si_2N_2O$-$Y_2Si_2O_7$ type composition of our invention is improved by 2-3 orders of magnitude over the commercial silicon nitride, hot-pressed body.

Because materials hot-pressed within the $Si_3N_4$-$Si_2N_2O$-$Y_2Si_2O_7$ compatibility triangle of FIG. 2 do not contain the unstable phases, they do not exhibit rapid oxidation at intermediate temperatures of about 1000° C. FIG. 4 illustrates the oxidation behavior at 1000° C of the material of our invention relative to the oxidation behavior of materials outside the compatibility triangle. The molar composition of the numbered materials tested in FIG. 4 are set forth in Table 2.

TABLE 2

| Material Number | Composition (mol fraction) | | |
|---|---|---|---|
| | $Si_3N_4$ | $Y_2O_3$ | $SiO_2$ |
| 1 | 0.87 | 0.13 | — |
| 3 | 0.94 | 0.06 | — |
| 36 | 0.80 | 0.10 | 0.10 |
| 38 | 0.50 | 0.50 | — |

As shown in FIG. 4, the $Si_3N_4$-$Si_2N_2O$-$Y_2Si_2O_7$ type materials do not exhibit any significant oxidation at 1000° C, whereas materials outside this compatibility triangle exhibit significant oxidation due to the presence of the unstable Y-Si-N-O phases. The weight changes of the dense materials within the compatibility triangle were negligible, for example, composition 1 of FIG. 2 exhibited a weight gain of only 0.01% for 1000 hours exposure at 1000° C in air.

The oxidation-resistance at 1370° C of materials within the $Si_3N_4$-$Si_2N_2O$-$Y_2Si_2O_7$ compatibility triangle were found to be superior to any hotpressed material observed to date. Table 3 lists the oxidation behavior in air of a representative material within the compatibility

TABLE 1

| Number | Initial Power Composition (Mol Fraction) | | | Measured Density (gm/cc)* | Theoretical Density | Strength** (psi) | |
|---|---|---|---|---|---|---|---|
| | $Si_3N_4$ | $Y_2O_3$ | $SiO_2$ | | | 25° C | 1400° C |
| 1 | 0.89 | 0.035 | 0.075 | 3.35 | 3.27 | 86,500 | 48,200 |
| 2 | 0.865 | 0.03 | 0.105 | 3.26 | 3.28 | 78,200 | 62,300 |
| 3 | 0.84 | 0.055 | 0.105 | 3.43 | 3.29 | 77,000 | 59,500 |
| 4 | 0.80 | 0.06 | 0.14 | 3.35*** | 3.32 | 73,300 | 46,200 |
| 5 | 0.75 | 0.075 | 0.175 | 3.42 | 3.36 | 65,300 | 58,700 |
| 6 | 0.50 | 0.10 | 0.40 | 3.26 | 3.19 | 58,500 | 45,600 |
| Commerical $Si_3N_4$ | | | | 3.21 | 3.18 | 95,000-110,000 | 25,000-35,000 |

*Tungsten carbide contamination causes measured density to be larger than theoretical
**Average of three values at each temperature
***5% of residual porosity As noted above, flexural strengths at 1400° C for the materials formulated within the compatibility triangle are significantly improved relative to the commercial triangle and compares it to materials hot-pressed with MgO.

TABLE 3

| Material | Oxidation Temperature (° C) | Oxidation Time (hrs) | Total Weight Gain (mg/cm$^2$) | Parabolic** Rate Constant (mg$^2$ cm$^{-4}$ hr$^{-1}$) |
|---|---|---|---|---|
| $Si_3N_4$ + $Y_2O_3$ + $SiO_2$* | 1370 | 235 | 0.15 | 9.75 × 10$^{-5}$ |
| Commercial $Si_3N_4$*** | 1370 | 235 | 2.06 | 1.80 × 10$^{-2}$ |

TABLE 3-continued

| Material | Oxidation Temperature (° C) | Oxidation Time (hrs) | Total Weight Gain (mg/cm$^2$) | Parabolic** Rate Constant (mg$^2$ cm$^{-4}$ hr$^{-1}$) |
|---|---|---|---|---|
| Si$_3$N$_4$ + 2 w/o MgO | 1370 | 400 | 1.71 | 7.31 × 10$^{-3}$ |

*Composition, mol fraction 0.84 Si$_3$N$_4$, 0.055 Y$_2$O$_3$, 0.105 SiO$_2$
**These materials exhibit parabolic oxidation kinetics: (wt gain)$^2$ = (parabolic rate constant) × (time)
***Hot-pressed with MgO.

As noted above, the material within the compatibility triangle exhibited about 1/15 the total amount of oxidation and had a parabolic rate constant which was 5 × 10$^{-3}$ less than commercial silicon nitride hot-pressed with MgO. This difference is significant for long term applications in high temperature oxidizing environments such as those present in gas turbine engines.

While several of the presently preferred embodiments of our invention have been described above, it will be obvious to those skilled in the art that certain modifications may be made without departing from the spirit and scope of the appended claims.

What is claimed is:

1. A sintered ceramic composition suitable for use as a high temperature structural material, said composition being within a triangular area defined by the points ABCA of the Si$_3$N$_4$-SiO$_2$-Y$_2$O$_3$ ternary diagram depicted in FIG. 2, and containing from about 0.03 to about 0.01 mol fraction Y$_2$O$_3$, from about 0.075 to about 0.40 mol fraction SiO$_2$, and the balance consisting of Si$_3$N$_4$.

2. A method of forming a composite material comprising the steps of:
   (a) providing a mixture of powder having a composition with the triangular area defined by the points ABCA of the Si$_3$N$_4$-SiO$_2$-Y$_2$O$_3$ ternary diagram depicted in FIG. 2, and containing from about 0.03 to about 0.10 mol fraction Y$_2$O$_3$, from about 0.075 to about 0.40 mol fraction SiO$_2$, and the balance consisting of Si$_3$N$_4$; and
   (b) hot-pressing the powder mixture in a non-oxidizing atmosphere at a temperature between 1600°–1800° C at a pressure of about 4000 psi for about 1 to 4 hours to obtain a densified article, said article being in excess of 98% of the theoretical density.

* * * * *

UNITED STATES PATENT AND TRADEMARK OFFICE
CERTIFICATE OF CORRECTION

PATENT NO. : 4,102,698
DATED : July 25, 1978
INVENTOR(S) : Frederick F. Lange and Subhash C. Singhal It is certified that error appears in the above-identified patent and that said Letters Patent are hereby corrected as shown below:

Column 5, line 28, cancel "0.01" and substitute --0.10 --.

Signed and Sealed this

Thirteenth Day of March 1979

[SEAL]

Attest:

RUTH C. MASON
Attesting Officer

DONALD W. BANNER
Commissioner of Patents and Trademarks